Oct. 31, 1939.  W. L. BOEKEL  2,178,390

GOLD PAN

Filed Jan. 23, 1939

INVENTOR
WILLIAM L. BOEKEL
BY
ATTORNEY

Patented Oct. 31, 1939

2,178,390

UNITED STATES PATENT OFFICE 2,178,390

GOLD PAN

William L. Boekel, San Francisco, Calif.

Application January 23, 1939, Serial No. 252,305

1 Claim. (Cl. 209—447)

This invention relates to improvements in gold pans and has particular reference to that type of pan commonly employed in washing gold out of gold bearing sand or dirt.

The principal object of this invention is to provide means for retaining the fine particles of gold in the pan in such a manner that they will not readily wash out of the pan as the water required for washing is agitated to carry away the unwanted material, such as sand, gravel, etc.

A further object of the invention is to produce a pan of this character which is operated in the same manner as the old-fashioned type of pan.

A further object is to produce a pan of this character which is economical to manufacture, one which is sturdy in construction, and one which may be readily transported from place to place.

A still further object is to provide means for emptying the concentrates from the pan after the same have been freed of unwanted material.

Other objects and advantages will be apparent during the course of the following description.

In the accompanying drawing forming a part of this specification and in which like numerals are employed to designate like parts throughout the same, Fig. 1 is a top plan view of my pan;

Figure 1:
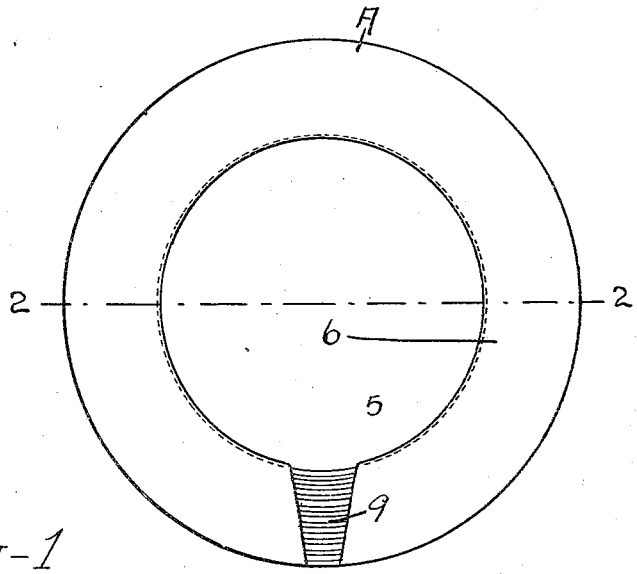
Figure 2:
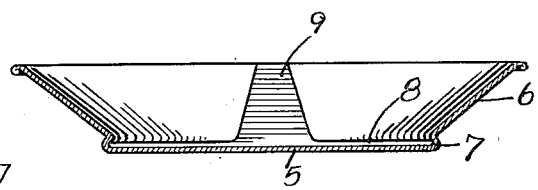
Fig. 2 is a vertical cross section taken on the line 2—2 of Fig. 1.
Figure 3:
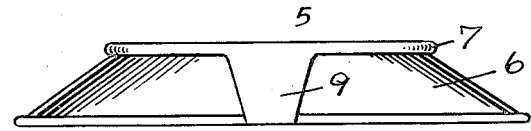
Fig. 3 is a side elevation of my pan in an inverted position.
Figure 4:
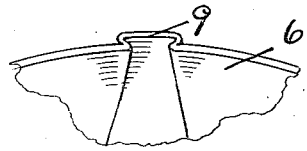
Fig. 4 is a fragmentary perspective view, showing the lip formation.

In the recovery of gold from gold bearing sand, gravel, and the like material it is necessary to wash this material in a considerable amount of water in order to separate the gold from the sand, etc. This is accomplished by placing a quantity of the gold bearing material in the pan together with a quantity of water and then, by a gyrating movement, slopping over the edge of the pan some of the water and some of the sand. Through repeated washings in this manner the agitation causes the heavier particles of gold to pass through the sand and to settle in the bottom of the pan, and, eventually, all of the sand is slopped over the edge of the pan, leaving in the bottom of the pan only the heavy gold nuggets as well as the fine gold, often referred to as "flour gold" or "colors".

With the pan commonly employed the side thereof meets the bottom thereof at an obtuse angle, with the result that it is a very simple matter if the operator agitates the pan too rapidly to wash some of the fine gold up the side of the pan and out of the pan.

Applicant has, therefore, produced a new form of pan wherein a groove or pocket is formed about the bottom of the pan at the junction between the bottom of the pan and the sides thereof. Applicant has further provided means for emptying this pocket when desired.

In the accompanying drawing wherein for the purpose of illustration is shown a preferred embodiment of my invention, the numeral 5 designates the bottom of the gold pan; and the numeral 6, the side wall thereof. At 7 is shown a bead so arranged as to produce an annular groove 8 within the pan, which groove will act as a pocket to catch heavy gold particles during the washing operation. At 9 is shown a depressed tapered lip through which the contents of the pocket may be discharged into the gold flask.

In use gold bearing material is placed on the bottom 5 and the pan partly filled with water. The operator then grasps the pan on the sides, and by causing a gyrating movement the water in the pan will swirl about and will be discharged over the edge of the pan at the point A together with some of the lighter or finer material. During this gyrating movement the agitation of the material taken with the action of the water will cause the heavier particles of gold to drop to the bottom of the pan and to work toward the outside edge thereof until confined in the pocket 8.

After all of the sand has been washed away, the gold confined in the pocket may be washed around the pocket until opposite the lip 9; and then by tipping the pan this gold may be poured into the gold flask.

It will thus be apparent that by using my pan there is much less danger of the finer gold particles being washed away with the sand during the concentrating process. Consequently, the user of my pan can wash a large amount of sand more quickly, as he will not have to handle the final washing in as delicate a manner as has been heretofore necessary.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

A gold concentrating device comprising a receptacle having a substantially flat bottom portion, a tapered side wall formed integral therewith, a pocket formed between said side wall and said bottom portion, and a depressed lip formed in said tapered side wall and communicating with said pocket said lip being tapered, with its narrowest part at the rim of the pan.

WILLIAM L. BOEKEL.